United States Patent [19]

Beadle

[11] Patent Number: 5,056,801
[45] Date of Patent: Oct. 15, 1991

[54] SEAL FOR A SHAFT
[75] Inventor: David E. Beadle, Birmingham, United Kingdom
[73] Assignee: Rover Group Limited, United Kingdom
[21] Appl. No.: 438,393
[22] PCT Filed: Apr. 11, 1989
[86] PCT No.: PCT/GB89/00370
 § 371 Date: Dec. 8, 1989
 § 102(e) Date: Dec. 8, 1989
[87] PCT Pub. No.: WO89/09900
 PCT Pub. Date: Oct. 19, 1989
[30] Foreign Application Priority Data
 Apr. 15, 1988 [GB] United Kingdom ............... 8808956
[51] Int. Cl.⁵ ............................................. B16F 15/22
[52] U.S. Cl. ..................................... 277/178; 277/180;
  277/188 R; 277/189.5
[58] Field of Search ............... 277/178, 101, 121, 180,
  277/188 A, 188 R, 189.5; 174/152 G, 153 G;
  16/2

[56] References Cited
U.S. PATENT DOCUMENTS 3,519,279  7/1970  Wagner ............................. 277/180
3,548,079  12/1970 Jones et al. ........................ 174/153
3,887,960  6/1975  Sherman ............................. 16/2
4,041,241  8/1977  Olmstead et al. ............... 277/178 X
4,656,689  4/1987  Dennis ................................ 16/2
4,822,079  4/1989  Schulte ............................... 16/2

FOREIGN PATENT DOCUMENTS 2366723  4/1978  France .

Primary Examiner—William A. Cuchlinski, Jr.
Assistant Examiner—James K. Folker
Attorney, Agent, or Firm—Davis, Bujold & Streck

[57] ABSTRACT

A seal for sealing a shaft to a sheet of material is provided, the seal having a hollow body to extend through an aperture in the sheet of material, an outwardly extending flange on one end of the body, at least one first annular sealing element extending radially inwardly of the body for cooperation with the shaft to provide a seal therebetween, a second annular sealing element interposed between the flange and a first face of the sheet of material to seal the flange to the sheet, and a retaining member on the other end of the body to retain the body in the aperture and bias the flange towards the first face of the sheet material, wherein the body and the flange are of relatively hard material and the first and second annular sealing elements are of relatively soft material.

6 Claims, 3 Drawing Sheets

SEAL FOR A SHAFT

BACKGROUND OF THE INVENTION

The present invention relates to seals for sealing a shaft to a sheet of material through which the shaft extends, and more particularly to a seal for sealing a shaft to a sheet of glass.

In modern vehicle and particularly car design where ever larger areas of glass are being used it is becoming increasingly necessary to mount a screen wiper motor beneath a glass screen wiped by the wiper. This necessitates that a shaft associated with a wiper arm should extend through the screen and be sealed thereto to prevent ingress of water into the vehicle.

DESCRIPTION OF THE RELATED ART

The prior art discloses a sealing method wherein a standard rubber grommet is forced into position in the hole with each flange thereof sprung against an opposing face of the glass sheet by the resilience of the rubber. This method suffers from the drawbacks that fitting of the grommet to the sheet of glass can be awkward and does not lend itself to automation, and secondly that sealing of the grommet to the glass is often difficult to achieve owing to the compromise necessary in selecting a consistency of rubber soft enough to provide a seal and hard enough to provide adequate support for sealing surfaces of the grommet.

SUMMARY OF THE INVENTION

It is an object of the invention to overcome the difficulties associated with the prior art.

According to the invention there is provided a seal for sealing a shaft to a sheet of material, the seal having a hollow body to extend through an aperture in the sheet of material, an outwardly extending flange on one end of the body, at least one first annular sealing element extending radially inwardly of the body for co operation with the shaft to provide a seal therebetween, a second annular sealing element interposed between the flange and a first face of the sheet of material to seal the flange to the sheet, and retaining means on the other end of the body to retain the body in the aperture and bias the flange towards the first face of the sheet of material, wherein the body and the flange are of relatively hard material and the first and second annular sealing elements are of relatively soft material.

Because the body and flange of the seal are of relatively hard material they provide a firm and accurate support for the relatively soft sealing elements. The sealing elements may thus be accurately located with respect to the shaft and sheet of material respectively to encourage sealing and to distribute stresses between the shaft and material in a controlled manner to avoid the possibility of the material cracking or suffering other permanent damage. Furthermore, the seal does not need to stand proud of the first face of the sheet by as much as does a rubber grommet because the relatively hard material used is better able to provide support for the sealing elements than is the rubber of the grommet.

The retaining means may comprise a plurality of resilient legs having outwardly extending feet on free ends thereof, the legs extending axially of the body from the other end thereof, the feet being biased by the legs into engagement with a second face of the sheet.

Preferably the retaining means comprises a plurality of resilient legs having outwardly extending feet on free ends thereof, the legs extending axially of the body from the other end thereof, and a washer positioned around the legs and secured against the second face of the sheet by the feet.

Most preferably the washer has a layer of relatively soft elastomeric material and a layer of relatively hard material, the layer of elastomeric material being arranged to bear against the sheet.

The presence of the washer, spreading retaining forces over the second face of the sheet, serves evenly to distribute said forces into the sheet, thereby minimising the possibility of damage to the sheet by the seal. Furthermore, the elastomeric layer on the washer serves to insulate the sheet from shock loads transmitted through the seal from the shaft whilst at the same time taking up tolerances between the seal and the sheet.

There may be two first annular sealing elements spaced from each other axially along the body whereby to orientate the shaft in the body.

Each leg of the retaining means may have an external taper towards its free end whereby to allow the feet to be pushed through the washer against the biasing of the legs upon assembly of the washer to the seal.

The body of the seal may have a relatively soft elastomeric annular element extending therearound to engage at least part of a bore of the aperture.

Preferably the body, flange, legs and feet of the seal comprise a single moulding, more preferably of plastics material.

The first and second annular sealing elements are preferably in the form of a single moulding and may be formed against the body and flange and interengaged therewith.

As an alternative the retaining means may be formed without legs or feet and a portion of the body may be rivetted over the washer, when in position, to secure the washer to the seal.

As a further alternative the retaining means may be formed without legs and feet and a portion of the body welded to the washer when in position to secure the washer to the seal.

BRIEF DESCRIPTION OF THE DRAWINGS

The present invention will now be more particularly described with reference to a preferred embodiment thereof as illustrated in the accompanying drawing of which.

DESCRIPTION OF THE PREFERRED EMBODIMENT

Figure 1:
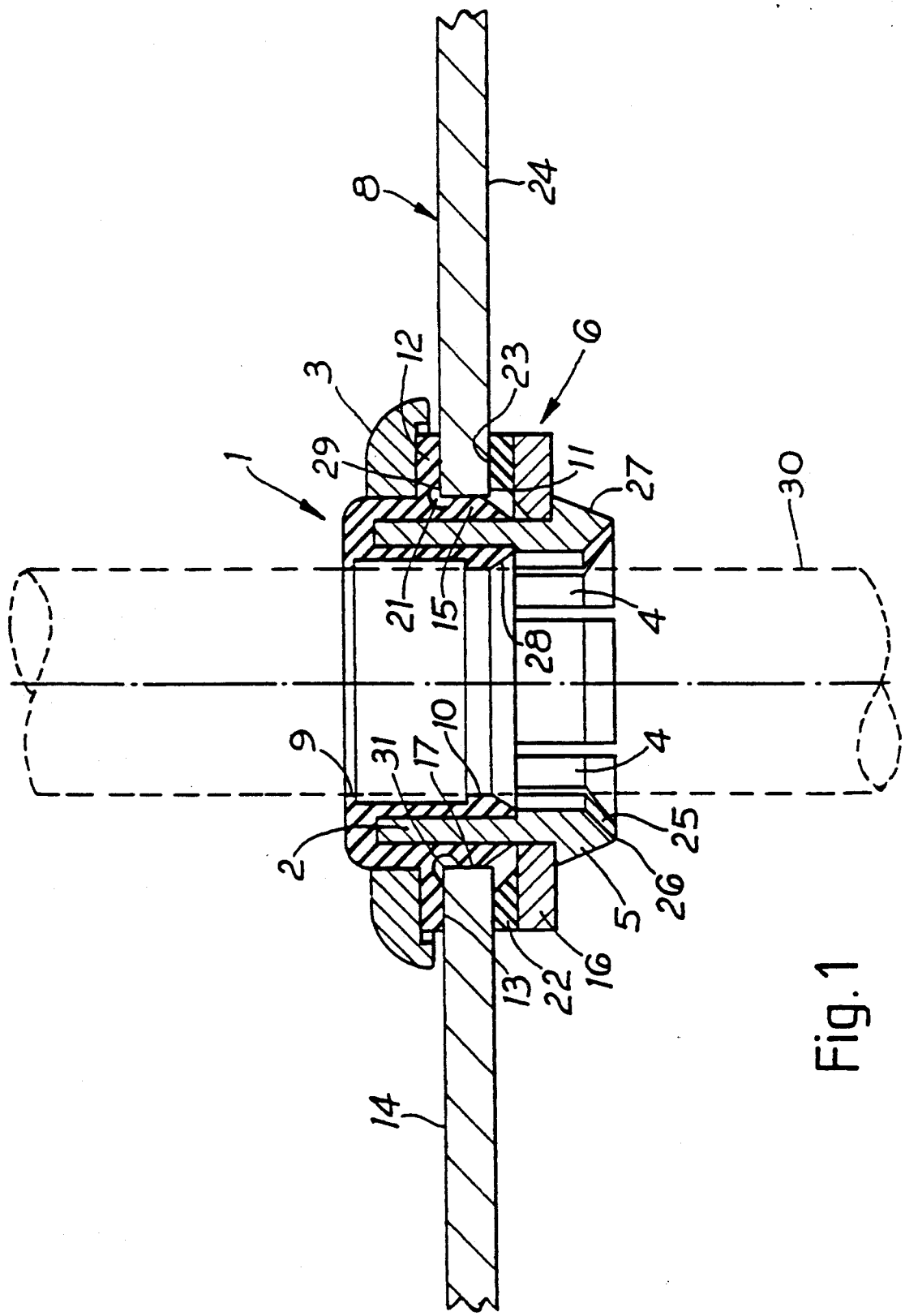
FIG. 1 is a vertical section of a seal according to the invention fitted between a shaft and a sheet of glass.
Figure 2:
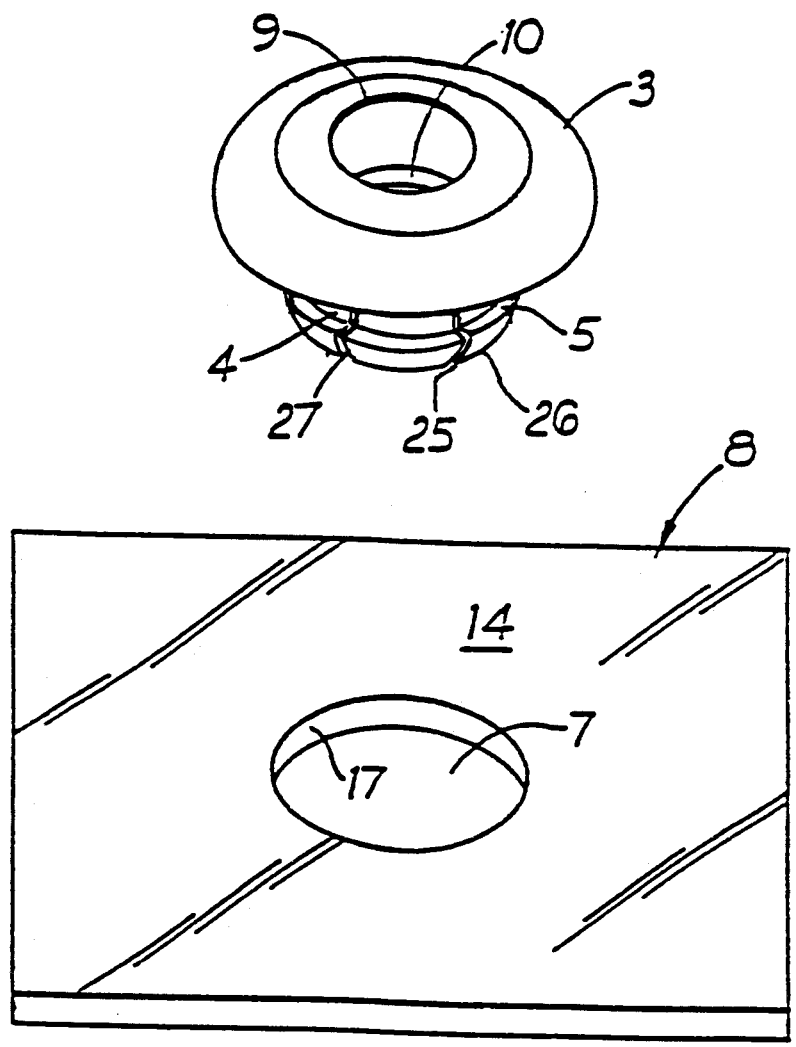
FIG. 2 is a perspective view of the seal and sheet of glass of FIG. 1, dismantled.
Figure 2:
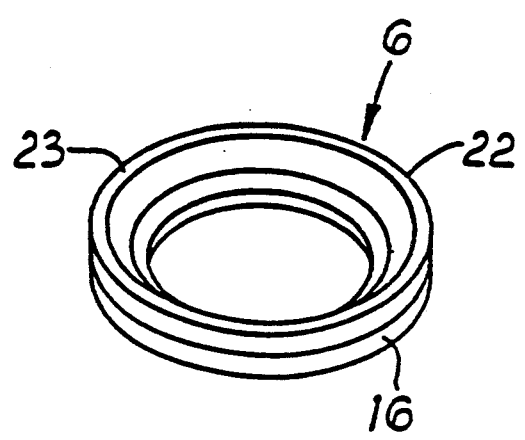

Referring to the drawing, a seal 1 has a body 2, and flange 3, resilient legs 4 having feet 5 engaged with a washer 6. The seal 1 is fitted to a shaft 30 in an aperture 7 defined in a sheet of glass 8.

The seal 1 has one first annular sealing element 9 and another first annular sealing element 10 both being of elastomeric material, extending inwardly of the body 2 and being compressed a pre determined amount against the shaft 30.

The flange has a second annular sealing element 12 of elastomeric material, having a sheet engaging face 13 and being compressed against a first face 14 of the sheet of glass 8.

The body 2 has an elastomeric annular element 15 extending therearound, the annular element 15 is lightly compressed by a pre determined amount against a bore 17 of the aperture 7 in the sheet 8 whereby to locate the seal 1 with respect to the sheet of glass 8 in the plane of the sheet of glass.

The second annular sealing element 12 and the annular element 15 are separated from one another by a relief groove 21 which leaves an area 29 of the first face 14 of the sheet 8 and a strip of bore 17 adjacent an edge 31 of the aperture 7 unengaged by the seal 1.

A washer 6 comprises a layer of relatively hard plastics material 16 and a layer of relatively soft elastomeric material 22 having a sheet engaging face 23 of greater internal diameter than the diameter of the aperture 7 leaving an area 11 of a second face 24 of the sheet 8 unengaged by the seal 1. The layer of relatively hard material 16 is positioned to be engaged and held by the feet 5 of the legs 4 to compress, by a pre determined amount, the layer of elastomeric material 22 against the second face 24 of the sheet 8. This causes a reaction, through the body 2 to the flange 3 to compress, in turn, the second annular sealing element 12 against the first face 14 of the sheet 8 sufficiently to form a seal therebetween.

From the above it will be appreciated that the seal 1 is in contact with the shaft 30 and sheet 8 only through elements of elastomeric material. The seal 1 may therefore be allowed to move a small amount with respect to the shaft 30 and/or sheet 8 without breaking the seal therebetween.

Each leg 4 has an internal taper 25 and each foot 5 has an external taper 27 towards a free end 26 of the leg 4 to assist with assembly. Similarly, the other first annular sealing element 10 has an internal taper 28 to assist in assembly.

Figure 3:
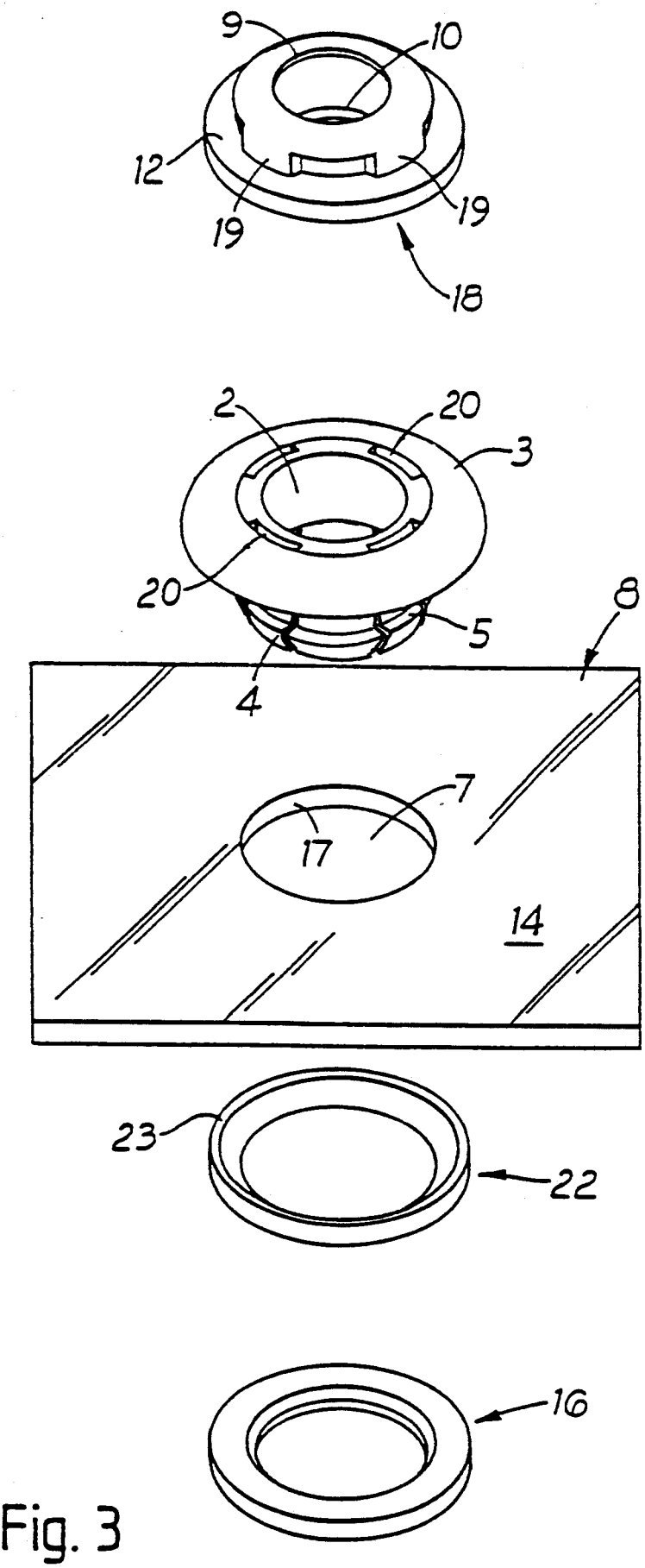
FIG. 3 is a perspective view of the seal and sheet of glass of FIG. 1 showing parts of the seal of relatively hard and relatively soft elastomeric material separately.

Referring to FIG. 3, it will be seen that the first and second annular sealing elements 9, 10, 12 and the annular element 15 (shown in FIG. 1) are in the form of a moulding 18 having four connecting portions 19 which extend through four slots 20 to enable the moulding 18 to be formed as a single moulding against the body 2 and flange 3 and to be interconnected therewith.

To assemble the shaft to the sheet of glass, using the seal, the legs 4 and feet 5 of the seal 1 are inserted through the aperture 7 so that the second annular sealing element 12 contacts the sheet 8. The washer 6 is then pushed over the taper 27 of the feet 5, deflecting the legs 4 inwards, until the third sealing element 22 engages the sheet 8 and the feet 5 spring outwards to engage behind the washer 6 and secure the seal in position. The shaft 30 is then pushed past the legs 4, the other first sealing element 15 and the one first sealing element 9 whereby to take up a position of use, sealed to the sheet 8 within the aperture 7.

It will be appreciated that the design of the seal according to the invention prevents the retaining means becoming disengaged whilst the shaft is in place therethrough owing to the shaft lying in close proximity to the legs and thereby preventing inward movement thereof and consequent disengagement of the feet.

It will be appreciated that, although the invention has been disclosed using the example of a shaft for a wiper motor extending through a sheet of glass, the invention is equally adpatable to other applications, for example to a mounting for a rear view mirror or a radio aerial to any body panel of a vehicle, or to mountings for a vehicle spoiler or airfoil to or through a body panel.

I claim:

1. A seal for sealing a shaft to a sheet of glass, the seal having a hollow body of relatively hard material to extend through an aperture in the sheet of glass, an outwardly extending flange of relatively hard material on one end of the body, at least one solid first annular sealing element of relatively soft elastomeric material, extending radially inwardly of the body, defining an outer annular surface in close proximity to the body and an inner annular surface for cooperation with the shaft to provide a seal between the body and the shaft, the annular space between the inner and outer annular surfaces being filled with the soft elastomeric material, a second annular sealing element of relatively soft elastomeric material interposed between the flange and a first face of the sheet of glass to seal the flange to the sheet of glass, a relatively soft elastomeric annular element extending around the body to engage a bore of the aperture, and retaining means on the other end of the body to bias the flange towards the first face of the sheet of glass and retain the body in the aperture, said retaining means comprising a plurality of resilient legs having outwardly extending feet on free ends thereof, the legs extending axially of the body from the other end thereof, and a washer comprising a layer of relatively soft elastomeric material and a layer of relatively hard material positioned around the legs and secured against the second face of the sheet of glass by the feet with the layer of soft elastomeric material being arranged to bear against the sheet of glass.

2. A seal according to claim 1, wherein there are two first annular sealing elements spaced from each other axially along the body to radially locate the shaft in the body.

3. A seal according to claim 1, wherein each leg has an external taper towards its free end whereby to allow the feet to be pushed through the washer against the biasing of the legs upon assembly of the washer to the seal.

4. A seal according to claim 1, wherein the body, flange, legs and feet of the seal comprise a single moulding.

5. A seal according to claim 1, wherein the first and second annular sealing elements are in the form of a single moulding formed against the body and flange and interengaged therewith.

6. A seal according to claim 1, wherein the first and second annular sealing elements are of elastomeric material.

* * * * *